(No Model.)

W. J. MATERN.
HANDLE BAR FOR BICYCLES.

No. 461,356. Patented Oct. 13, 1891.

WITNESSES:
N. R. Davie.
C. Sedgwick.

INVENTOR:
W. J. Matern
BY Munn & Co.
ATTORNEYS

UNITED STATES PATENT OFFICE.

WILLIAM J. MATERN, OF BLOOMINGTON, ILLINOIS.

HANDLE-BAR FOR BICYCLES.

SPECIFICATION forming part of Letters Patent No. 461,356, dated October 13, 1891.

Application filed January 19, 1891. Serial No. 378,285. (No model.)

*To all whom it may concern:*

Be it known that I, WILLIAM J. MATERN, of Bloomington, in the county of McLean and State of Illinois, have invented a new and Improved Handle-Bar for Bicycles, of which the following is a full, clear, and exact description.

My invention relates to improvements in handle-bars for bicycles, and it is especially intended for Safety bicycles, although it may be used upon other kinds of machines.

The handle-bar ordinarily used upon bicycles is perfectly rigid, and in traveling over rough roads or obstructions of any kind the vibrations of the handle are communicated to the hands and arms, which soon become extremely tired, owing to the vibrations.

The object of my invention is to obviate this difficulty by producing a handle-bar of simple construction which will yield vertically and will not jolt the hands and arms, and which, when lifted upon by the hands, will be as rigid as the ordinary handle-bar. The object of having the handle rigid while it is being lifted upon is that in ordinary usage the bars are pressed downward by the hands; but in going uphill the rider lifts upon the bar to hold himself in proper position on the machine, and it is necessary that the bar be rigid during this operation.

To this end my invention consists in the construction which will be hereinafter fully described, and then pointed out in the claim.

Reference is to be had to the accompanying drawings, forming a part of this specification, in which similar letters of reference indicate corresponding parts in all the figures.

Figure 1:
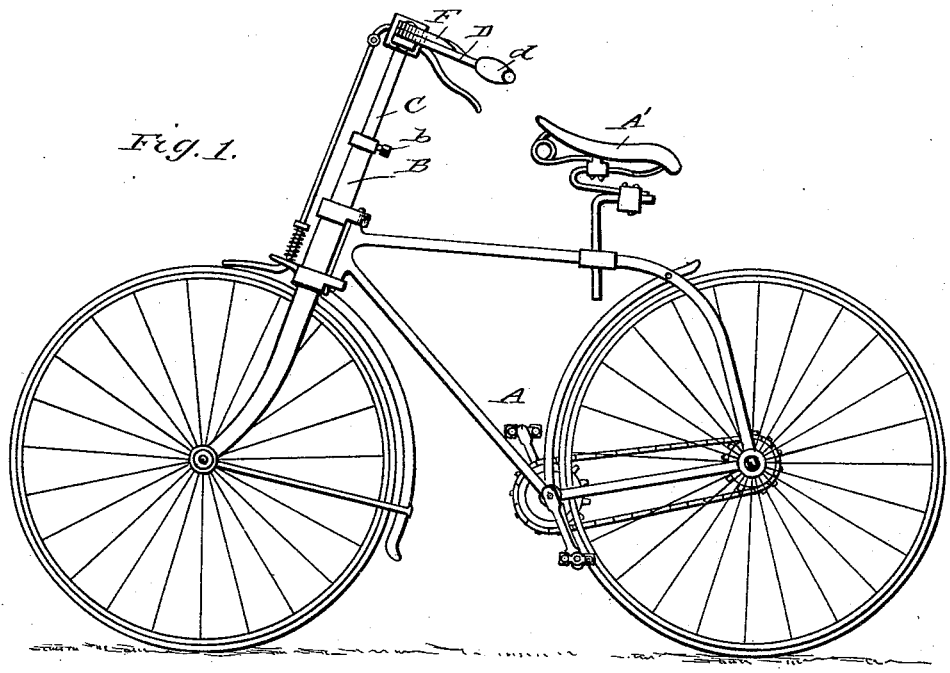
Figure 2:
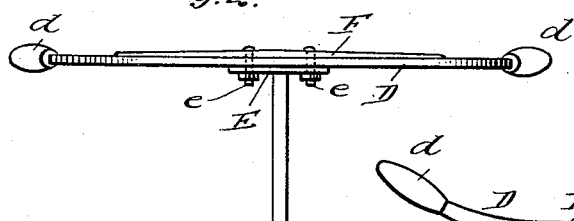
Figure 3:
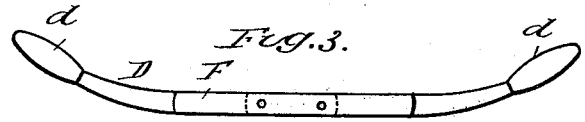

Figure 1 is a side elevation of a Safety bicycle provided with a handle-bar embodying my invention. Fig. 2 is a broken detail front elevation of the handle-bar and its supporting-standard, and Fig. 3 is a plan of the same.

A is a Safety bicycle of ordinary construction, having the customary seat A' and having a socket B at the upper end of the fork, in which the standard C is held and adjusted by a set-screw b in the usual manner, and on the top of the standard is a handle-bar D, which rests centrally upon a cross-piece E, which cross-piece is firmly secured or formed integrally with the standard C. The handle-bar D is formed of flat spring metal and is curved to the desired shape, the ends of the bar terminating in handles d, and, if desired, spade-handles or any other variety of handle may be used instead of the plain handle shown in the drawings. The handle-bar D is secured flatwise to the cross-piece E, so that the strain on the bar, when it is used for steering, will come edgewise upon it, and when moved in this way it will be as rigid as any ordinary handle-bar; but when the rider presses downward upon the handles the strain will come flatwise upon the handle-bar, and it will yield sufficiently to prevent ordinary shock and vibration from being communicated to the hands and arms.

It is necessary that the handle-bar be rigid when it is lifted upon for the reason stated above, and to give it the necessary rigidity a supplemental strip or spring F is placed upon the top and is shaped to correspond with the shape of the handle-bar, the said strip being secured to the handle-bar by bolts e, which extend downward through the strip F, the handle-bar D, and the cross-piece E, thus securing the said parts together.

In the drawings I have shown the bar composed of a single piece and provided with one supplemental strip or spring; but it is obvious that the handle-bar may be made of several flat springs, and that two or more strengthening-strips may be used, if desired.

The vertical standard C is ordinarily used in bicycles, and instead of securing the handle-bar thereto in the manner described it may be secured in any convenient way.

Having thus described my invention, I claim as new and desire to secure by Letters Patent—

The combination, with the supporting-standard, of a flat spring handle-bar secured flatwise to the upper end of the standard and provided with handles at its ends, and a strengthening-strip clamped to the upper side of the handle-bar, substantially as described.

WM. J. MATERN.

Witnesses:
   J. F. STRICKLE,
   M. SWANN.